United States Patent
Kasahara et al.

(10) Patent No.: US 11,504,819 B2
(45) Date of Patent: Nov. 22, 2022

(54) CONTROL DEVICE OF MACHINE TOOL

(71) Applicant: MAKINO MILLING MACHINE CO., LTD., Tokyo (JP)

(72) Inventors: Tadashi Kasahara, Kanagawa (JP); Kazunari Ishii, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 285 days.

(21) Appl. No.: 16/651,745

(22) PCT Filed: Sep. 28, 2018

(86) PCT No.: PCT/JP2018/036537
§ 371 (c)(1),
(2) Date: Mar. 27, 2020

(87) PCT Pub. No.: WO2019/066058
PCT Pub. Date: Apr. 4, 2019

(65) Prior Publication Data
US 2020/0230760 A1     Jul. 23, 2020

(30) Foreign Application Priority Data
Sep. 29, 2017     (JP) .............................. JP2017-191064

(51) Int. Cl.
*B23Q 3/155* (2006.01)
*G05B 19/4061* (2006.01)
(Continued)

(52) U.S. Cl.
CPC ......... *B23Q 3/15546* (2013.01); *G05B 17/00* (2013.01); *G05B 19/4061* (2013.01);
(Continued)

(58) Field of Classification Search
None
See application file for complete search history.

(56) References Cited

U.S. PATENT DOCUMENTS 7,290,474 B2 * 11/2007 Keller .................... F16P 3/148
83/639.4
2014/0233839 A1     8/2014 Morita et al.

FOREIGN PATENT DOCUMENTS

| CN | 104126157 A | 10/2014 |
| JP | 2009-80517 A | 4/2009 |
| KR | 10-1672807 B1 | 11/2016 |

OTHER PUBLICATIONS

Kim, Su-Jin. "Short and safe tool setting by safe space in NC machining." The International Journal of Advanced Manufacturing Technology 33.9 (2007): 1017-1023. (Year: 2007).*

(Continued)

*Primary Examiner* — Carlos R Ortiz Rodriguez
(74) *Attorney, Agent, or Firm* — Morrison & Foerster LLP

(57) ABSTRACT

This control device of a machine tool is provided with: a storage unit which stores in advance a nominal diameter and a nominal length of a blade part of a rotary tool; an image-capturing instruction unit which outputs an image-capturing instruction to an image-capturing device; a model creation unit which generates model data of the blade part of the tool on the basis of the nominal diameter and the nominal length stored in the storage unit, generates model data of a tool shank and holder on the basis of an image stored in the image-capturing device, and creates model data of the rotary tool on the basis of the generated model data of the blade part and the generated model data of the tool shank and holder.

5 Claims, 10 Drawing Sheets

(51) Int. Cl.
G05B 19/4093 (2006.01)
G05B 17/00 (2006.01)
G05B 19/4069 (2006.01)

(52) U.S. Cl.
CPC ... *G05B 19/4069* (2013.01); *G05B 19/40932* (2013.01); *G05B 2219/37227* (2013.01); *G05B 2219/37237* (2013.01); *G05B 2219/37334* (2013.01); *G05B 2219/49157* (2013.01)

(56) References Cited

OTHER PUBLICATIONS

Laaksonen, Janne. "Visual measurement and modelling of tool wear in rough turning." (2008). (Year: 2008).*

Yu, Zhanjiang, et al. "Tool wear inspection method for small lathe." 2014 IEEE International Conference on Mechatronics and Automation. IEEE, 2014. (Year: 2014).*

Pokorný, Peter, Rudolf Zaujec, and Ivan Buranský. "Methodology measuring geometry of the shank cutting tools." (2015). (Year: 2015).*

* cited by examiner

CONTROL DEVICE OF MACHINE TOOL

CROSS-REFERENCE TO RELATED APPLICATIONS

This application is a U.S. national phase patent application of International Patent Application No. PCT/JP2018/036537 filed Sep. 28, 2018, which claims the priority of Japanese Application No. 2017-191064 filed Sep. 29, 2017, which are hereby incorporated by reference in the present disclosure in their entirety.

FIELD OF THE DISCLOSURE

The present invention relates to a machine tool controller which can easily generate rotary tool model data from image data in which the rotary tool is captured without the influence of swarf and the groove shape of the rotary tool.

BACKGROUND OF THE DISCLOSURE

In recent numerically controlled machine tools, a virtual three-dimensional model of the machine tool is generated and the virtual three-dimensional model is simulated in synchronization with the operation of the machine tool. Patent Literature 1 describes a machine tool which specifies position by measuring the dimensions of a machining tool using tool measuring means, corrects the dimensions of the machining tool in a virtual three-dimensional model using the measured dimensions, and corrects the position of the machining tool on the machine tool in the virtual three-dimensional model based on the specified position.

PATENT LITERATURE

PTL 1 Japanese Unexamined Patent Publication (Kokai) No. 2009-080517

SUMMARY OF THE DISCLOSURE

Though Patent Literature 1 describes a method in which an outer peripheral surface detection pin and an end surface detection pin are brought into contact with the outer peripheral surface and the end surface of a rotating grindstone to measure the outer diameter and thickness of the rotating grindstone, in this method, it is not possible to measure tools such as drills and end mills which have grooves which extend in a helical shape in the outer peripheral surface of the rotary tool.

Furthermore, though Patent Literature 1 also describes a method in which a drill serving as the tool is measured using a laser beam, measuring the outer diameter and length of a tool such as a drill having a complicated side surface shape or outer peripheral surface shape using a laser beam is a time-consuming operation. Thus, such a tool measurement method cannot be applied to a machining center which uses a plurality of tools while sequentially exchanging the tools using a tool exchange device to machine a single workpiece.

The present invention aims to solve such problems of the prior art and has an object to provide a machine tool controller which can quickly, easily, and accurately create tool models.

In order to achieve the object described above, according to the present invention, there is provided a machine tool controller which comprises an imaging device for imaging a rotary tool and which performs control by referencing image data of the imaged rotary tool and model data of the rotary tool, the controller comprising a storage unit which stores in advance a nominal diameter and nominal length of a blade of the rotary tool, an imaging command unit which outputs an imaging command to the imaging device, a blade model generation unit which generates blade model data of the tool from the nominal diameter and nominal length stored in the storage unit, a tool shank/holder model generation unit which generates tool shank/holder model data from the image captured with the imaging device, and a model creation unit which creates model data of the rotary tool from the blade model data and the tool shank/holder model data.

According to the present invention, since tool shank/holder model data is generated based on captured image data of the rotary tool for the tool shank and tool holder, which have comparatively simple shapes, blade model data is generated not from the image data but from the nominal diameter and nominal length of the blade of the rotary tool stored in advance in the storage unit for the blade, which has a complicated shape, and these sets of model data are combined to generate model data for the rotary tool. Thus, it is possible to quickly, easily, and accurately generate model data of a rotary tool. The model data of the rotary tool generated in this manner can be used, for example, to simulate interference between the rotary tool and the workpiece before or during machining.

DETAILED DESCRIPTION OF THE DISCLOSURE

Preferred embodiments of the present invention will be described below with reference to the attached drawings.

Figure 2:
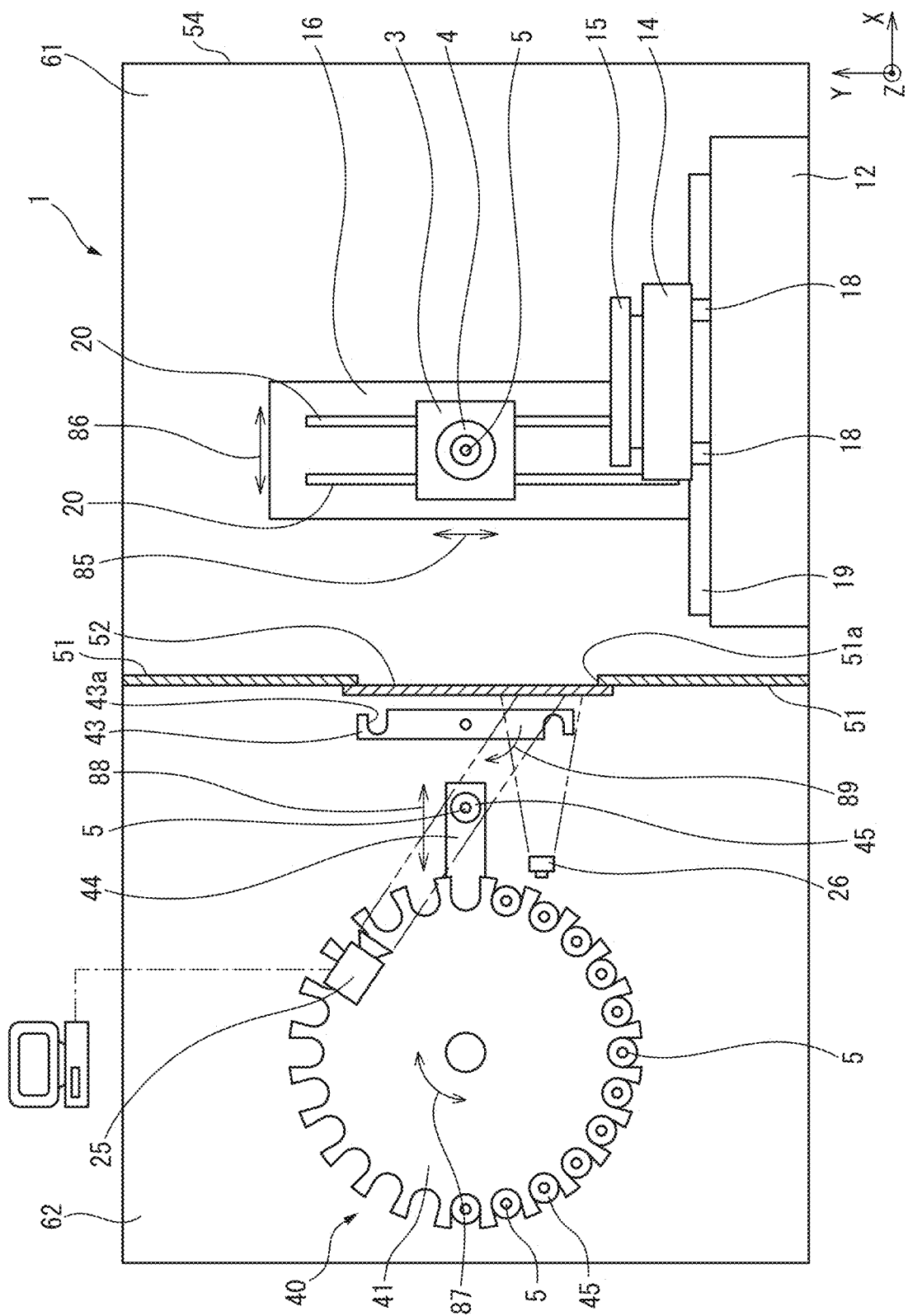
FIG. 2 is a schematic front view of a machine tool to which the present invention is applied.
Figure 3:
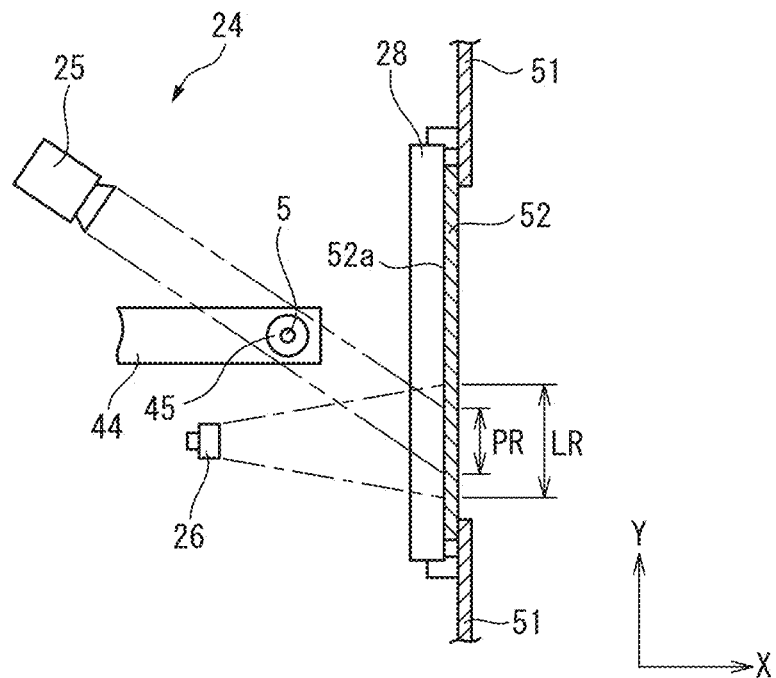
FIG. 3 is a schematic cross-sectional view of a tool shape measurement device.
Figure 4:
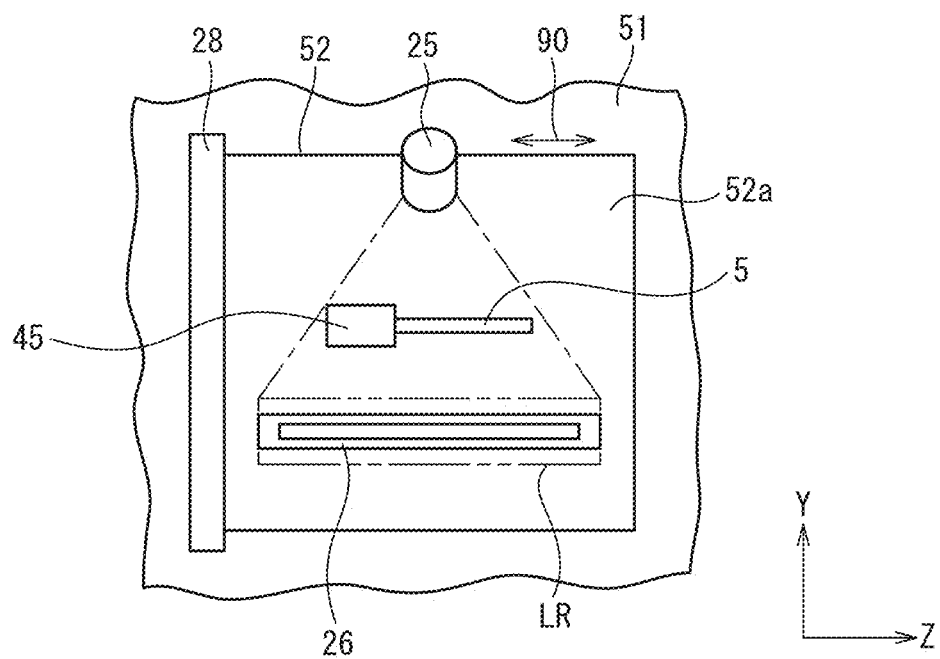
FIG. 4 is a schematic front view of the tool shape measurement device.

First, referring to FIGS. 2 to 4, the machine tool to which the present invention is applied is of a numerically-controlled type which performs machining by automatically moving a tool and a workpiece relative to each other based on a machining program. The machine tool 1 is a horizontal machining center. The machine tool 1 comprises a feed device which moves a tool and a workpiece relative to each other along three orthogonal X-, Y-, and Z-axes. The feed device moves the driven object in the directions of a plurality of movement axes.

The machine tool 1 comprises a bed 12 as a base. An X-axis guide rail 19 which extends in the X-axis direction, which is the horizontal left and right directions, is affixed to the upper surface of the bed 12. A column 16 is arranged on an upper surface of the X-axis guide rail 19. The column 16 is formed so as to be capable of moving along the X-axis guide rail 19, as indicated by arrow 86. Y-axis guide rails 20 which extend in the Y-axis direction, which is the upward and downward directions, are affixed to the front surface of the column 16. A spindle head 3 is supported on the Y-axis guide rails 20. The spindle head 3 is formed so as to be capable of moving along the Y-axis guide rails 20, as indicated by arrow 85.

Furthermore, Z-axis guide rails 18 which extend in the Z-axis direction, which is the horizontal forward and rearward directions, are affixed to the upper surface of the bed 12. A table 14 is arranged on the upper surfaces of the Z-axis guide rails 18. A workpiece is affixed to the table 14 via a pallet 15. The table 14 is formed so as to be capable of moving in the Z-axis direction along the Z-axis guide rails 18.

Each of the X-axis, Y-axis, and Z-axis feed devices can include a ball screw (not illustrated) which extends in the X-axis, Y-axis, or Z-axis direction, an X-axis, Y-axis, or Z-axis servo motor (not illustrated) which is connected to one end of the ball screw, and a nut (not illustrated) which is attached to the column 16, spindle head 3, or table 14 and which engages with the ball screw. Furthermore, measurement devices such as X-axis, Y-axis, and Z-axis digital scales (not illustrated) are provided for measuring the coordinate position in the X-axis, Y-axis, and Z-axis directions, respectively.

The spindle head 3 supports a spindle 4 so as to be capable of rotating about an axis of rotation extending in the horizontal forward and rearward directions. A rotary tool 5 for machining a workpiece is attached to the tip of the spindle 4. A servo motor (not illustrated) which rotatably drives the spindle 4 is incorporated in the spindle head 3.

The machine tool 1 moves the rotary tool 5 in the X-axis direction and Y-axis direction and moves the workpiece in the Z-axis direction. It should be noted that the feed devices are not limited to this form, and the tool can be moved relative to the workpiece with any device. Furthermore, in addition to linear feed axes, the machine tool may include rotary feed axes which rotate around predetermined axes.

The machine tool 1 comprises a tool exchange device 40 which automatically exchanges tools. The machine tool 1 comprises a machining chamber 61 in which workpieces are machined and a tool storage chamber 62 in which tools are stored. The machining chamber 61 and the tool storage chamber 62 are surrounded by a splashguard 54. Furthermore, the machining chamber 61 and the tool storage chamber 62 are partitioned by a partition 51. The bed 12, column 16, spindle head 3, etc., are arranged in the machining chamber 61. The tool exchange device 40 is arranged in the tool storage chamber 62. An opening 51a for moving tools between the machining chamber 61 and the tool storage chamber 62 is formed in the partition 51. Furthermore, a shutter 52 for opening and closing the opening 51a is formed in the partition 51. The shutter 52 is supported on the partition 51.

The machine tool 1 includes a motor which drives the shutter 52. The shutter 52 is formed so as to be movable relative to the partition 51. The shutter 52 of the present embodiment is formed so as to be movable in the Z-axis direction. By moving the shutter to form an opening, a rotary tool 5 can move through the opening 51a.

The tool exchange device 40 includes a tool magazine 41 which holds a plurality of rotary tools 5, and a transfer device which transfers tools between the tool magazine 41 and the spindle 4. The tool magazine 41 of the present embodiment is formed such that the rotary tools 5 are held via the tool holder 45 around a disc-shaped base material. The tool exchange device 40 includes a motor which rotates the tool magazine 41. The tool magazine 41 rotates as indicated by arrow 87.

The transfer device includes a tool shifter 44 and a tool exchange arm 43. The tool shifter 44 moves tools between the tool magazine 41 and a tool standby position. When the tool shifter 44 moves in the direction indicated by arrow 88, the rotary tool 5 is removed from the tool magazine 41 or the rotary tool is attached to the tool magazine 41. The tool exchange arm 43 has a rod-like shape. The tool exchange arm 43 includes, on both ends thereof, retention parts 43a which hold rotary tools 5. The tool exchange device 40 includes a motor which rotates the tool exchange arm 43. The tool exchange arm 43 is formed so as to be rotatable about a rotary axis extending the in the Z-axis direction, as indicated by arrow 89.

The standby position is a position in which tools can be exchanged between the tool exchange arm 43 and the tool shifter 44. Specifically, an end of the tool exchange arm 43 which does not hold a tool receives a tool from the tool shifter 44, which holds the tool at the standby position, and the other end of the tool exchange arm 43 which holds a tool transfers the tool to the empty tool shifter 44 waiting at the standby position.

When a rotary tool 5 is exchanged, the spindle head 3 moves to a predetermined position for exchanging rotary tools 5 in the machining chamber 61. When the tool exchange arm 43 rotates, the spindle head 3 is moved to a position in which the rotary tool 5 attached to the spindle 4 can be held by the retention part 43a. The rotary tool 5 which has completed machining is attached to the spindle 4. In the tool storage chamber 62, the tool magazine 41 rotates to a position in which a rotary tool 5 to be used next can be held by the tool shifter 44. The tool shifter 44 moves the rotary tool 5 to be used next from the tool magazine 41 to the standby position.

Next, the shutter 52 opens and the tool exchange arm 43 rotates. The tool exchange arm 43 holds the rotary tool 5 held in the tool shifter 44 and the rotary tool 5 attached to the spindle 4. Further, the tool exchange arm 43 rotates, whereby the rotary tool 5 to be used next is attached to the spindle 4 and the rotary tool 5 which has completed machining is attached to the tool shifter 44. The tool shifter 44 returns the rotary tool 5 which has completed machining to the tool magazine 41.

The tool exchange device 40 can move a rotary tool 5 attached to the spindle 4 to the tool magazine 41 in this manner. Furthermore, the tool exchange device 40 can move a rotary tool 5 stored in the tool magazine 41 to the spindle 4. After rotary tool 5 exchange is complete, the tool exchange arm 43 rotates to the initial state. After the shutter 52 closes, the subsequent machining begins in the machining chamber 61.

It should be noted that the tool exchange device is not limited to the form described above, as long as it is formed so as to be capable of exchanging a tool attached to the spindle with a tool stored in the tool magazine.

FIG. 3 is a cross-sectional view of a tool shape measurement device according to the present embodiment. FIG. 4 is a schematic front view of the tool shape measurement device according to the present embodiment. FIGS. 2 to 4 show a state in which a rotary tool 5 held in the tool shifter 44 is arranged in the standby position. Referring to FIGS. 2 to 4, the machine tool 1 comprises a tool shape measurement device 24 which measures the shape of rotary tool 5 by imaging the tool. The tool shape measurement device 24 is an imaging device. Furthermore, the tool shape measurement device 24 is a backlight system in which, in an image obtained by imaging the rotary tool 5, the background of the rotary tool 5 is bright while the rotary tool 5 is dark.

The imaging device images the rotary tool 5 arranged in a predetermined imaging position in the interior of the tool storage chamber 62. The imaging device includes a camera 25. Any camera capable of performing image processing of an image, such as a CCD (Charge Coupled Device) camera can be used as the camera 25. The camera 25 of the present embodiment is arranged so that the rotary tool 5 is imaged when the rotary tool 5 is arranged in the standby position. It should be noted that the imaging position is not limited to the standby position but can be set to any position. The imaging device can, for example, image the tool immediately after machining is completed. Alternatively, the imaging device can image the tool to be used next.

The shutter 52 of the present embodiment serves as a reflector arranged on the opposite side of the camera 25 with respect to the tool in the direction facing from the camera 25 toward the rotary tool 5, which is arranged in the standby position. The shutter 52 is arranged behind the rotary tool 5 when viewed from the camera 25. The camera 25 is arranged at a position where almost the entire background of the tool in the image becomes the shutter 52 when the rotary tool 5 is imaged in the standby position. The shutter 52 is arranged in a position where it insects a straight line connecting the camera 25 and the rotary tool 5 arranged in the standby position. The rotary tool 5 is arranged between the shutter 52 and the camera 25.

The shutter 52 has a reflective surface 52a which reflects light. The reflective surface 52a is formed so as to scatter light. In the present embodiment, the surface facing the interior of the tool storage chamber 62 corresponds to the reflective surface 52a, among the area maximum surfaces where the area of the shutter 52 is maximum. In the shutter 52 of the present embodiment, the reflective surface 52a is painted.

The reflector is not limited to this form as long as it is formed so as to scatter at least a part of the light incident thereon. In other words, the reflector may be any material unless it has a mirror surface property which reflects substantially all incident light in a single direction. For example, the reflector may have an exposed metal surface in which the surface is unpainted. The reflector can be formed from any material. Any color can be used when painting the surface of the reflector. In particular, among various paints, a matte paint having a high brightness, such as light gray used for the inner wall surface of a sheet metal cover of a machine tool, is effective.

The tool shape measurement device 24 comprises an illumination device 26 as a light source which emits light toward the shutter 52. The illumination device 26 of the present embodiment is LED (Light Emitting Diode) lighting. Since the shutter 52 scatters light on the reflective surface 52a, a part of the light emitted by the illumination device 26 is directed toward the camera 25. Thus, the tool shape measurement device 24 of the present embodiment is used not in a direct illumination method in which the rotary tool 5 is directly illuminated but rather an indirect illumination method in which the rotary tool 5 is illuminated with reflected diffuse light. The illumination device 26 is arranged so that an image in which the tool is darker than the background of the tool due to the diffuse light reflected on the reflective surface 52a of the shutter 52 is captured.

Referring to FIG. 3, when the rotary tool 5 arranged at the standby position is projected from the camera 25 onto the shutter 52, a projection region PR can be determined. Furthermore, an illumination region LR which is mainly illuminated by light when the illumination device 26 illuminates the shutter 52 can be determined. The illumination region LR is preferably large so as to contain the projection region PR therein.

Figure 5:
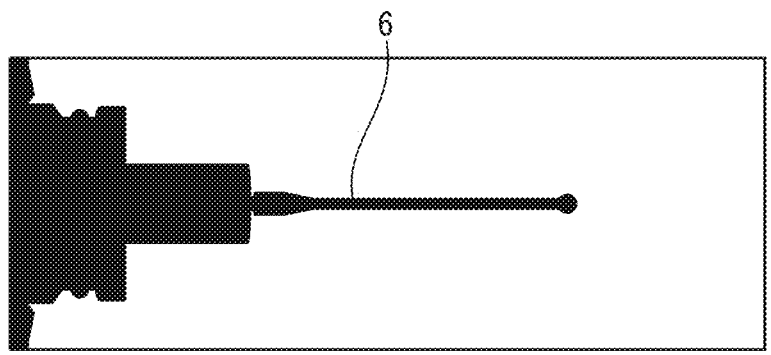
FIG. 5 is a view showing an example of an image captured with an imaging device.

FIG. 5 shows an example of an image when a tool is imaged by the imaging device of the present embodiment. In the example shown in FIG. 5, a probe 6 corresponding to the tool is used. When the tool is imaged, the tool portion is entirely black. In contrast thereto, the background of the tool is brightened by the diffuse light of the reflector. Thus, the imaging device captures an image in which the tool is darker than the background of the tool. For example, when the color of the light emitted by the illumination device is white, the background of the tool is white and the tool is black. The controller can calculate the shape of the tool using such an image.

In a method in which a tool is directly irradiated, the tool is imaged in a state in which the entirety of the tool is bright. However, when the tool is directly irradiated, light may be strongly reflected by a portion of the tool in some cases. As a result, this portion of the tool becomes very bright, whereby the shape of the entirety of the tool becomes blurry in some cases. Conversely, in the backlight method of the present embodiment, the tool portion is dark. Since the tool portion does not become bright, the shape of the tool can be measured with high accuracy.

Referring to FIGS. 3 and 4, the illumination device 26 preferably has a brightness with which the entirety of the tool imaged by the camera 25 becomes black. In other words, the illumination device 26 is preferably a bright light source which generates a brightness such that the entirety of the tool becomes black. Due to this structure, the shape of the tool in the captured image becomes clear and the shape of the tool can be more accurately measured.

Further, the tool shape measurement device 24 performs imaging with diffuse light reflected by the shutter 52. When the machine tool 1 is driven, foreign matter such as fine swarf, lubricating oil supplied to sliding portions, or coolant may adhere to the reflective surface 52a of the shutter 52. The foreign matter such as fine swarf serves as a part of the reflector for reflecting light at the surface. Thus, the present invention has a feature that foreign matter is unlikely to be captured in the background of the tool. In other words, the tool shape measurement device 24 can reduce the likelihood of black objects appearing in the background of the tool due to the swarf and the like becoming shadows. As a result, the shape of the tool can be accurately measured.

In the tool shape measurement device 24, the reflector which reflects light is constituted by the shutter 52. The shutter 52 moves in the direction indicated by arrow 90 when tools are exchanged (refer to FIG. 4). Even in the case in which large foreign matter adheres to the reflective surface 52a of the shutter 52, the large foreign matter falls off along with movement of the shutter 52. Thus, the impact of foreign matter on the background of the captured image of the tool can be suppressed.

Furthermore, in the shutter 52 of the present embodiment, the reflective surface 52a extends in the vertical direction. In other words, the shutter 52 is supported by the partition 51 in an upright state. Thus, even when foreign matter adheres to the reflective surface 52a of the shutter 52, the present invention has the characteristic that foreign matter easily falls off under the action of gravity. The reflector is preferably arranged so that the reflective surface is vertical in this manner.

Further, the tool shape measurement device 24 comprises a brush 28 as a removal member which is formed so as to contact the reflective surface 52a of the shutter 52 and remove foreign matter adhered to the reflective surface 52a. The brush 28 has a bar-like shape. The brush 28 extends in the direction orthogonal to the movement direction of the shutter 52 indicated by arrow 90. The brush 28 extends in the Y-axis direction. The length of the brush 28 is greater than the Y-axis direction length of the shutter 52. The brush 28 has a length sufficient to contact from one end of the shutter 52 to the other end in the direction orthogonal to the movement direction of the shutter 52.

When a rotary tool 5 mounted on the spindle 4 and a rotary tool 5 stored in the tool magazine 41 are exchanged, as the shutter 52 moves in the direction represented by arrow 90, the brush 28 slides against the reflective surface 52a of the shutter 52 and removes foreign matter. By providing a brush 28 in this manner, even without a dedicated brush drive mechanism solely for removing foreign matter, the foreign matter adhered to the reflective surface 52a of the shutter 52 can be removed. In particular, the brush 28 can remove large foreign matter.

The removal member for removing foreign matter is not limited to a brush, and any member which removes foreign matter adhered to the reflective surface can be used. For example, a rubber lip seal can be used as the removal member. The lip seal includes a rubber plate which extends in a bar shape. Foreign matter adhered to the reflective surface of the shutter can be removed by sliding of the rubber plate against the reflective surface along with the movement of the shutter.

Any lighting other than LED lighting can be used as the illumination device 26. By using LED lighting as the illumination device 26, brightness can be increased in a short time. Thus, the time needed for imaging can be reduced. Furthermore, LED lighting allows the illumination device to be smaller as compared to other illumination devices.

The illumination device 26 is preferably arranged in a position in which swarf or the like is unlikely to adhere thereto. For example, the illumination device 26 is preferably arranged such that the back surface thereof faces the tool magazine 41. The illumination device 26 preferably includes a device for removing foreign matter which is adhered to the light-emitting surface. An example of the device for removing foreign matter includes a device which sprays a cleaning solution onto the surface of the illumination device 26. Furthermore, it is preferable that the camera 25 be arranged in a position which is higher than the imaging position of the rotary tool 5 at the time at which imaging is performed. There is a risk that foreign matter adhered to the rotary tool 5 within the machining chamber may fall from the rotary tool 5 in the vicinity of the imaging position, but adhesion of foreign matter to the surface of the lens of the camera 25 can be suppressed by this structure. Furthermore, the reflector is arranged in a position lower than the imaging position of the rotary tool 5, and thus, even if foreign matter falling from the rotary tool 5 adheres thereto, the imaging device can suitably image the rotary tool 5 as described above.

Figure 6:
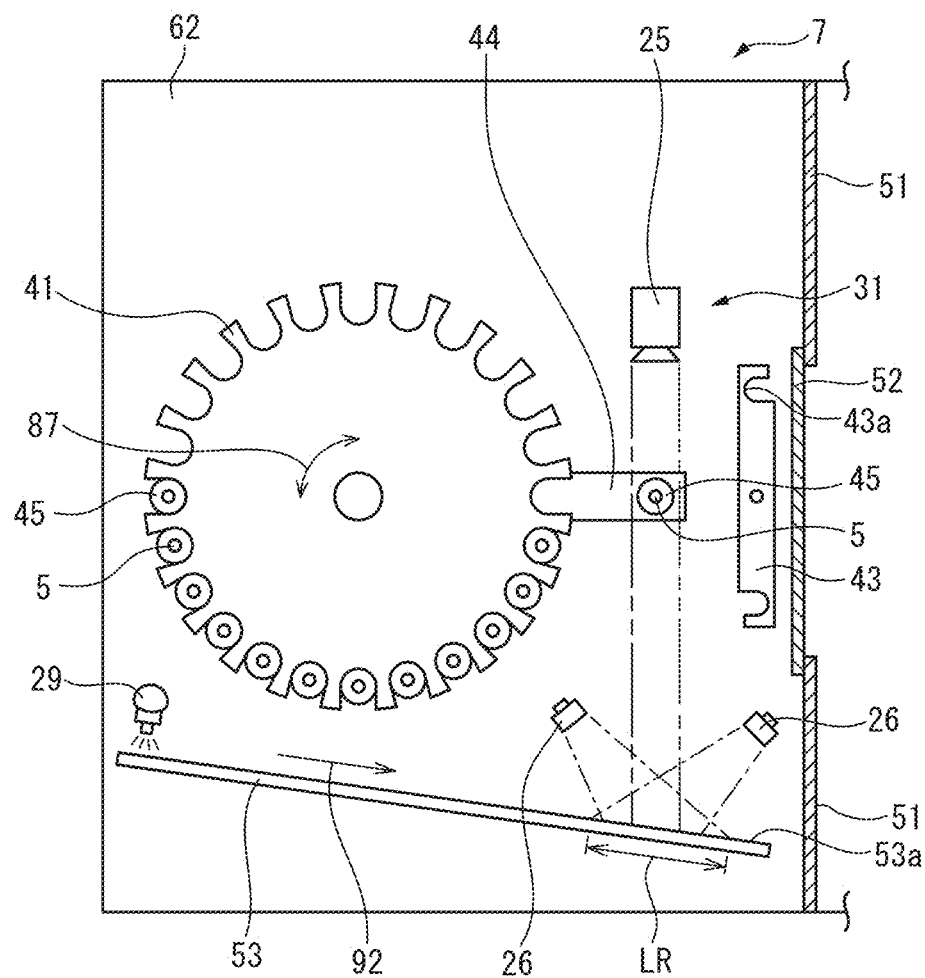
FIG. 6 is a schematic cross-sectional view of a machine tool according to a second embodiment.

FIG. 6 shows a machine tool according to a second embodiment. FIG. 6 is a schematic cross-sectional view of a portion of the tool storage chamber 62. The machine tool 7 comprises a tool shape measurement device 31. The reflector of the tool shape measurement device 31 is constituted by an oil pan 53 arranged in the bottom of the tool storage chamber 62. The oil pan 53 has a plate-like shape. The oil pan 53 receives foreign matter such as swarf, lubricating oil, and coolant falling from the devices arranged in the tool storage chamber 62 and directs the foreign matter to a predetermined position. In the tool shape measurement device 31, the camera 25 is arranged so as to image a rotary tool 5 arranged in the standby position from above in the vertical direction. In the tool shape measurement device 31, the upper surface of the oil pan 53 serves as the light-reflecting reflective surface 53a. The illumination device 26 illuminates a portion of the reflective surface 53a of the oil pan 53 so that the background of the rotary tool 5 becomes bright.

The reflective surface 53a of the oil pan 53 guides liquids such as coolant. Liquids have properties which scatter light incident on the surfaces thereof. Thus, when a liquid is present on the illumination region LR on which the light is incident, the liquid is unlikely to be reflective in the background of the tool. As a result, when liquid flows along the surface of the oil pan 53, the tool can be suitably imaged. It should be noted that in the present embodiment, as described above, since imaging is performed using reflected light, the impact of small foreign matter can also be suppressed.

Furthermore, the machine tool 7 comprises a cleaning solution supply device which supplies a cleaning solution onto the reflective surface 53a of the oil pan 53. The cleaning solution supply device includes a cleaning solution nozzle 29. The cleaning solution supplied from the cleaning solution nozzle 29 flows as indicated by arrow 92 due to the gradient of the oil pan 53. The cleaning solution cleans the reflective surface 53a. Thus, large foreign matter remaining on the reflective surface 53a of the oil pan 53 can also be removed. It should be noted that when the cleaning solution supply device is provided, the removal member for removing foreign matter adhered to the reflective surface 53a of the oil pan 53 may be omitted.

Furthermore, the tool shape measurement device 31 comprises a plurality of illumination devices 26. The light source includes a first light source and a second light source which are arranged in different positions. By providing a plurality of illumination devices 26, the reflector can be illuminated from a plurality of directions. As a result, the generation of shadows by large foreign matter can be suppressed. The reflection of black objects in the background of the tool in the image can be suppressed. Alternatively, by providing a plurality of illumination devices 26, the background of the tool in the image can be brightened and the occurrence of color variation, etc., in the background of the tool in the image can be suppressed. As a result, the shape of the tool can be accurately measured. The other structures, operations, and effects are the same as those of the first machine tool, and thus descriptions thereof will not be repeated herein.

Figure 1:
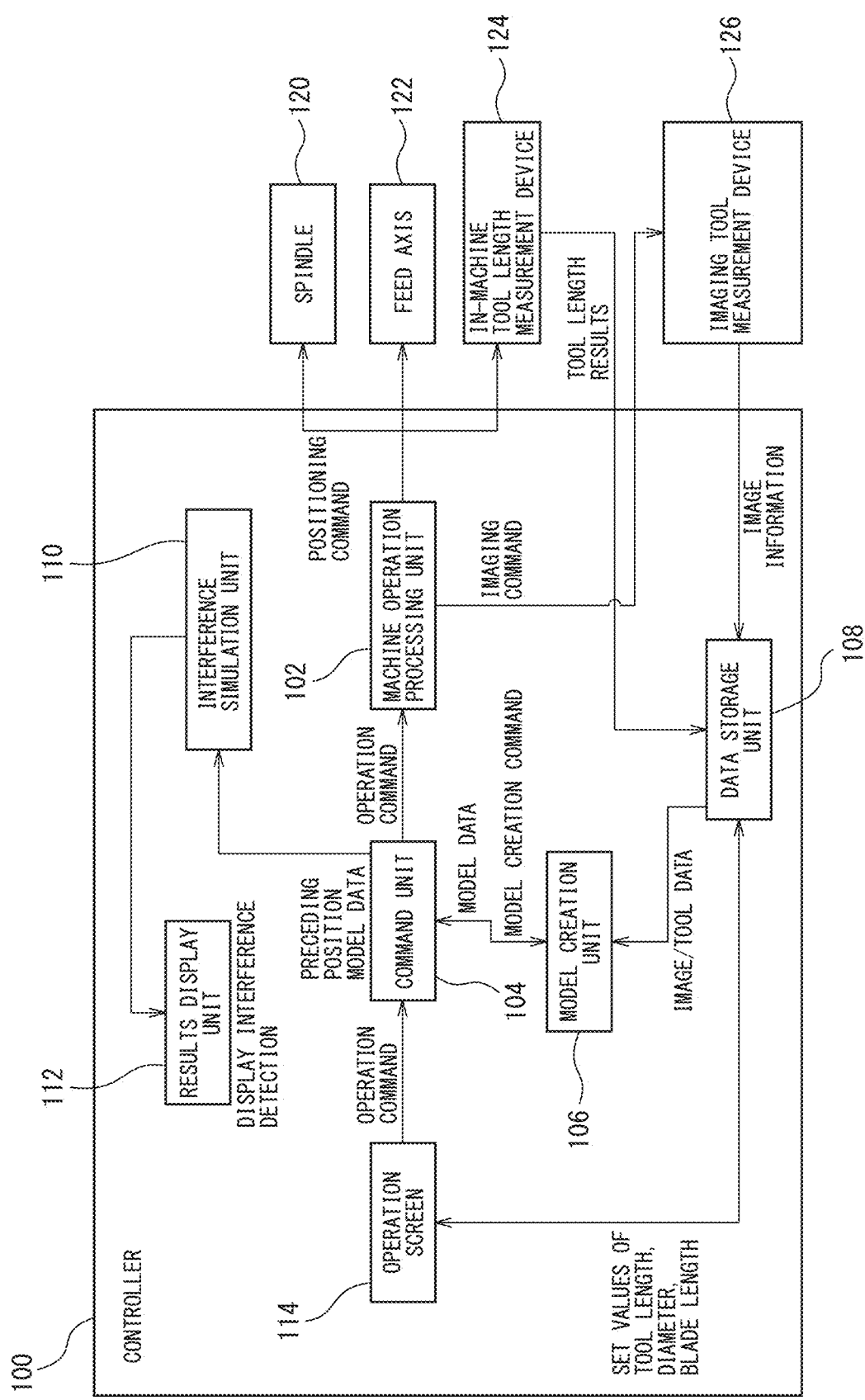
FIG. 1 is a block diagram of a controller of a machine tool according to the present invention.

The machine tool 1 according to the present embodiment has a controller which controls the machine tool 1. FIG. 1 illustrates a block diagram of a controller according to a preferred embodiment of the present invention. The controller 100 can be formed by a computer including microprocessors such as a CPU (Central Processing Unit) which are connected to each other via busses, memory devices such as RAM (Random Access Memory) and ROM (Read-Only Memory), an electronic data storage device such as a hard disk or solid state drive (SSD), etc. The controller 100 may be formed by an NC device which controls the feed devices of the machine tool 1 and/or a machine controller which controls the tool magazine 41, the tool shifter 44, the tool exchange device 40, and the tool shape measurement device 24. Further, the controller 100 may be formed by a plurality of computer devices including NC devices and/or machine controllers.

The controller 100 comprises, as primary constituent elements, a machine operation processing unit 102, a command unit 104, a model creation unit 106, a data storage unit 108, an interference simulation unit 110, a results display unit 112, and an input unit 114. The command unit 104 outputs operation commands and model creation commands to the machine operation processing unit 102 and the model creation unit 106 in accordance with the instructions from the operator input to the controller 100 from the input unit 114. The command unit 104 outputs the model data output from the model creation unit 106 to the interference simulation unit 110. The input unit 114 can be formed by, for example, various buttons, input keys, and a touch panel (not illustrated) provided on the operation panel of the machine tool 1.

The machine operation processing unit 102 outputs positioning commands to the servo motor 112 and tool length measurement device 124 of each feed device in accordance with operation commands from the command unit. The machine operation processing unit 102 further acts as an imaging command unit which outputs an imaging command to an imaging tool measurement device 126 including the tool shape measurement device 24. The imaging tool measurement device 126 outputs captured image data to the data storage unit 108. The data storage unit 108 can be formed by the RAM and ROM and a predetermined storage area of the storage device.

Tool data is stored in advance in the data storage unit 108 in association with the tool numbers assigned to each tool. The tool data includes at least the nominal diameters and nominal lengths of the blades of the rotary tools held in the tool magazine 41. The numerical values described in, for example, the catalogs of the tools can be used as the nominal diameters and nominal lengths of the blades. Alternatively, prior to attaching a rotary tool 5 to the tool magazine 41, nominal diameter and nominal length may be determined by individually measuring, in advance, each rotary tool 5 outside of the machine tool using a tool presetter. It should be noted that in the present invention, the nominal diameter and nominal length of the blade refers to, among the dimensions of the rotary tool 5, the dimensions of the portion having a cutting edge for cutting the workpiece. The nominal diameter of the blade is the outer diameter of the trajectory when the cutting edge which cuts the workpiece rotates. The nominal length of the blade is the length of the blade of the rotary tool 5 in the direction of the axis of rotation and refers to the length of the portion having the cutting edge which is capable of cutting a workpiece.

Furthermore, the tool data can include tool length (the length from the tip of the rotary tool 5 mounted on the spindle 4 to the gauge line), which is the length in the axial direction including the tool holder which holds the tool. Conventionally, the axial direction length (tool length) of the tool is defined in the machining program by the length between the gauge line and the tip of the tool. Tool length can be measured, in advance, for all of the tools held in the tool magazine 41 after a rotary tool 5 has been mounted on the tip of the spindle 4 using a tool length measurement device 124 on or in the machine tool 1, and the tool lengths can be stored in the data storage unit 108 in association with the tool numbers of the rotary tools 5. Alternatively, tool length may be measured on or in the machine tool 1 each time tool exchange is performed.

A contact-type displacement sensor comprising, for example, a hollow housing, a coil spring arranged within the housing, a probe which is attached to one end of the coil spring and which protrudes from the housing, and a displacement meter which outputs an electrical signal indicating the amount of axial direction displacement of the coil spring can be used as the tool length measurement device 124 for measuring tool length. By arranging such a displacement sensor at an appropriate place on the table 14, the tool length can be measured using the X-axis, Y-axis, and Z-axis feed devices.

Furthermore, workpiece model data, which is the three-dimensional shape data of the workpiece, and machine model data representing the structure of the machine tool 1 are stored in the data storage unit 108. When a jig is used to secure the workpiece to the pallet, three-dimensional shape data of the jig can be stored.

Interference simulation results in the interference simulation unit 110 are displayed on the results display unit 112. The results display unit 112 can be the same touch panel as the input unit 114. The results display unit 112 may be formed by another monitor device, for example, a personal computer arranged on a different floor than the machine tool 1.

The operations of the present embodiment will be described below referring to FIGS. 7A, 7B, and 8A to 8C.

Figure 7A:
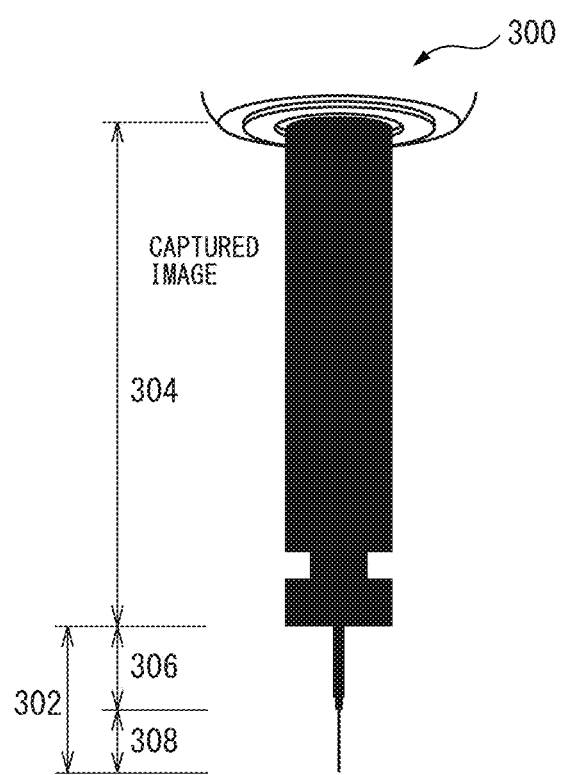
FIG. 7A is a schematic view showing a binary image obtained by imaging a rotary tool held in a tool holder.
Figure 7B:
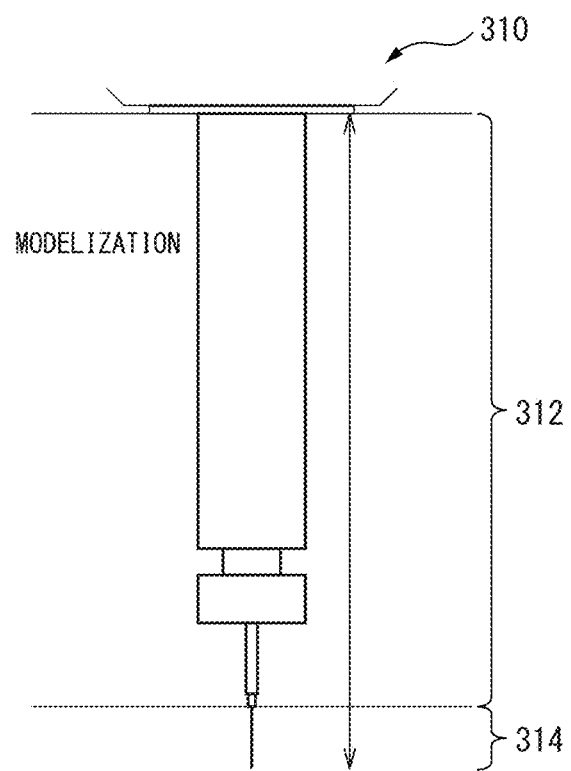
FIG. 7B is a schematic view showing a tool model of a rotary tool obtained by converting the binary image of FIG. 7A into a rotating body.

FIG. 7A shows a binary image 300 of the tool imaged by the imaging tool measurement device 126 (tool shape measurement device 24). FIG. 7B shows a tool model 310 created by the model creation unit 106 based on the binary image 300. The binary image 300 includes a portion 302 of the tool and a portion 304 of the tool holder, which holds the tool. The portion 302 of the tool includes a portion 306 of the tool shank and a portion 308 of the blade formed with the cutting edge.

Figure 8A:
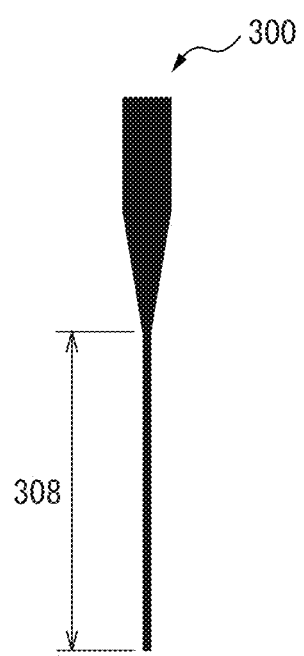
FIG. 8A is a schematic view showing an enlarged binary image of a blade portion of the rotary tool of FIG. 7A.

The model creation unit 106 calls the image data of the imaged rotary tool 5 from the data storage unit 108. As can be understood from FIG. 7A, in the image data of the rotary tool 5, the portion 306 corresponding to the shank and the portion 304 corresponding to the hold holder have relatively simple shapes. In contrast thereto, in particular as shown in FIG. 8A, the portion 308 corresponding to the blade has a complex shape since a helix-shaped groove is formed in the side surface or outer peripheral surface of the tool.

The model creation unit 106, in particular a tool shank/holder model generation unit (not illustrated) in the model creation unit 106, first generates a binary image of the rotary tool 5 by binarizing the image data of the rotary tool 5 imaged by the imaging tool measurement device 126. Next, the portion corresponding to the tool length from the tip of the binary image to the gauge line is extracted. Further, the portion corresponding to the nominal length of the blade is removed from the extracted binary image and the binary image is converted into a rotating body, whereby a tool shank/holder model 312 (FIG. 7B) corresponding to the portion 306 of the tool shank and the portion 304 of the tool holder is generated.

Figure 8B:
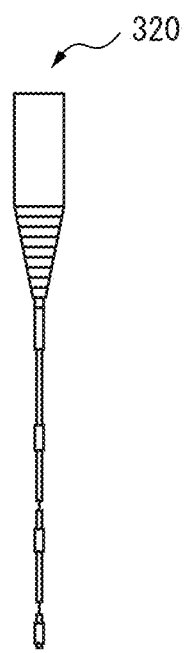
FIG. 8B is a schematic view showing a tool model obtained by converting the binary image of FIG. 8A into a rotating body.
Figure 8C:
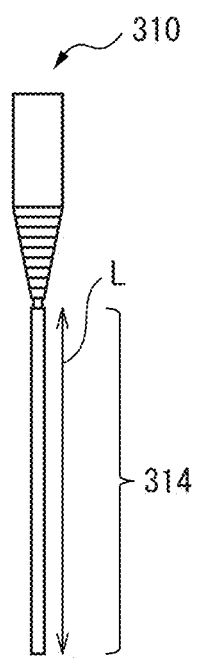
FIG. 8C is a schematic view showing a blade model generated based on a nominal diameter and nominal length of the blade of the rotary tool of FIG. 7A.

As described above, the portion 308 corresponding to the blade has a complex shape since a helix-shaped groove is formed in the side surface or outer peripheral surface of the tool. Thus, even if such image data is binarized and converted into a rotating body, a discontinuous image is produced, as shown in FIG. 8B, whereby the portion corresponding to the blade cannot be modeled as-is. In the present embodiment, a columnar or cylindrical blade model 314 is generated based on the nominal diameter and nominal length of the blade of the called rotary tool 5. As shown in FIG. 8C, the model creation unit 106 creates a model 310 of the rotary tool 5 by combining the tool shank/holder model 312 generated by the tool shank/holder model creation unit and the blade model 314 generated by the blade model generation unit.

The created rotary tool 5 model data can be output from the model creation unit 106 to the interference simulation unit 110 via the command unit 104. The interference simulation unit 110 also receives workpiece model data and machine model data of the machine tool 1 from the data storage unit 108. The interference simulation unit 110 simulates whether the rotary tool 5 will interfere with a portion of the workpiece or machine tool 1 by virtually executing the machining program based on the received model data of the rotary tool 5, the workpiece model data, and the machine model data. The simulation results are shown on the results display unit 112.

According to the present invention, model data of the rotary tool 5 is created based on image data of the imaged rotary tool 5 in this manner, whereby it is not necessary to create in advance and store in the data storage unit 108 model data of all of the rotary tools 5 held in the tool magazine 41. Thus, even when the workpiece to be machined by the machine tool 1 and/or the machining program is changed or when a rotary tool 5 held in the tool magazine 41 is replaced, it is not necessary to newly change the model data of the rotary tool 5. Furthermore, since the rotary tool 5 is imaged while on standby at the standby position in the tool storage chamber 62 at the time of tool exchange, model data thereof is created without delaying the machining processes.

According to the present invention, since a simple columnar or cylindrical blade model is generated for the blade of the rotary tool, which has a complex shape, based on the nominal diameter and nominal length of the blade, rather than creating a model of the entirety of the rotary tool with the captured image data, whereby it is possible to create model data for rotary tools which can be used for interference simulation even with a low-cost and low-resolution camera.

REFERENCE SIGNS LIST

24 Tool Shape Measurement Device
25 Camera
26 Illumination Device
100 Controller
102 Machine Operation Processing Unit
104 Command Unit
106 Model Creation Unit
108 Storage Unit
108 Data Storage Unit
110 Interference Simulation Unit
112 Results Display Unit
114 Input Unit
120 Servo Motor
122 Servo Motor
124 Tool Length Measurement Device
126 Imaging Tool Measurement Device
300 Binary Image
310 Tool Model
312 Tool Shank/Holder Model
314 Blade Model

The invention claimed is:

1. A machine tool controller which comprises an imaging device for imaging a rotary tool and which performs control by referencing image data of the imaged rotary tool and model data of the rotary tool, the controller comprising:
   a storage unit which stores in advance a nominal diameter and nominal length of a blade of the rotary tool,
   an imaging command unit which outputs an imaging command to the imaging device,
   a blade model generation unit which generates blade model data of the tool from the nominal diameter and nominal length stored in the storage unit,
   a tool shank/holder model generation unit which generates tool shank/holder model data from the image captured with the imaging device, and
   a model creation unit which creates model data of the rotary tool from the blade model data and the tool shank/holder model data.

2. The machine tool controller to of claim 1, wherein the storage unit stores a tool length, which is an axial direction length from a tip of the rotary tool, which is mounted on a spindle of a machine tool, to a gauge line, and the tool shank/holder model generation unit extracts a portion corresponding to the tool length from the image data of the imaged tool and generates the tool shank/holder model data by removing the portion corresponding to the nominal length of the blade of the rotary tool from the extracted image data.

3. The machine tool controller of claim 1, further comprising an interference simulation unit which simulates whether or not a workpiece and the rotary tool interfere prior to machining using the model data created by the model creation unit.

4. The machine tool controller of claim 1, wherein the machine tool comprises a tool magazine which holds a plurality of rotary tools, a tool exchange device which exchanges the rotary tool mounted on a spindle of the machine tool with a rotary tool held by the tool magazine, wherein the imaging device images a rotary tool awaiting exchange for use in a subsequent machining step.

5. The machine tool of claim 2, wherein the machine tool comprises a machining chamber in which a workpiece is machined, and a tool storage chamber in which a tool magazine is arranged, wherein the imaging device is arranged within the tool storage chamber.

* * * * *